Patented Dec. 31, 1935

2,025,719

UNITED STATES PATENT OFFICE 2,025,719

METHOD AND APPARATUS FOR MEASURING SMALL DISPLACEMENTS

Ludwig W. Blau, Andrew B. Bryan, and Whitman D. Mounce, Houston, Tex., assignors to Standard Oil Development Company, a corporation of Delaware Application November 21, 1930, Serial No. 497,104

18 Claims. (Cl. 177—351)

This invention relates to improvements in methods and apparatus for the measurement or indication of small spatial displacements by variation in the capacity of an electrical system. In accordance with the invention, the displacement to be measured or indicated is caused to move one set of condenser plates with respect to another set of such plates. The resulting changes in capacity are caused to produce a suitable signal.

The displacement may be a minute expansion or contraction, as in the determination of the coefficient of thermal expansion of a solid or the volumetric changes of liquids and gases, or the displacement may be a vibration caused by sound waves acting on the diaphragm of a microphone, or the like. Owing to the extreme sensitiveness of the present instrument, a particularly advantageous use is in the study of earthquakes, either natural or such as are produced as an incident to geophysical exploration. The suggested uses are illustrative and others will be apparent to those skilled in this art.

Figure 1:
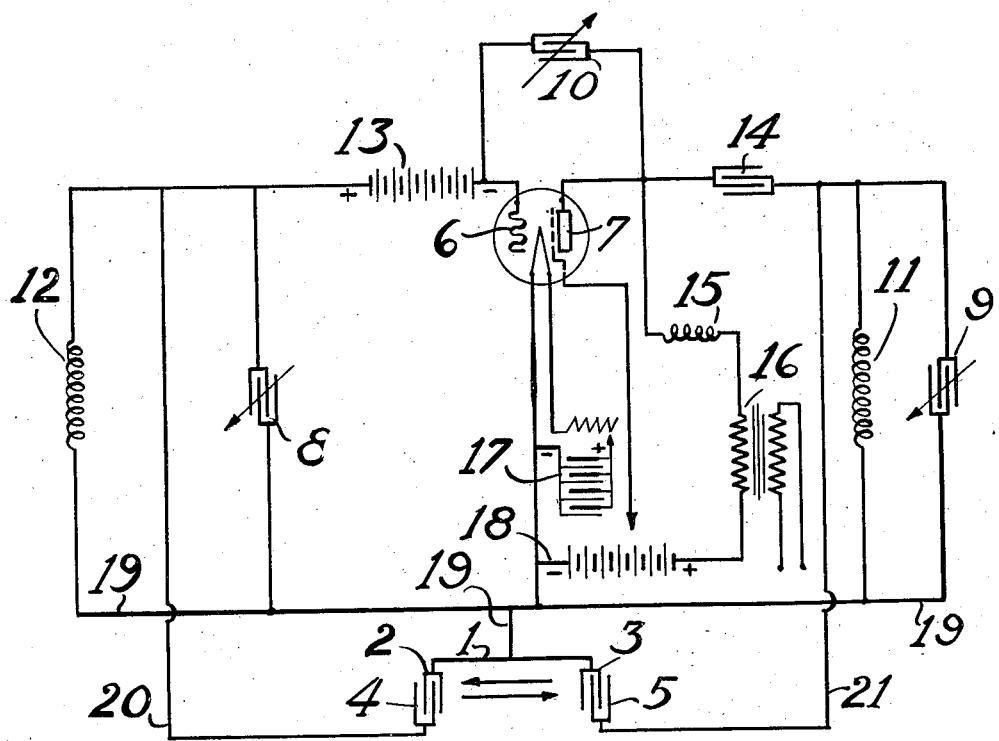
Figure 2:
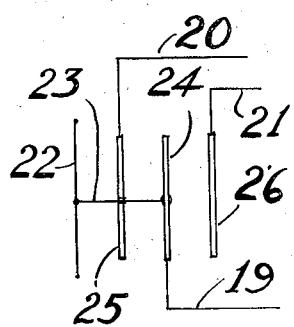
Figure 3:
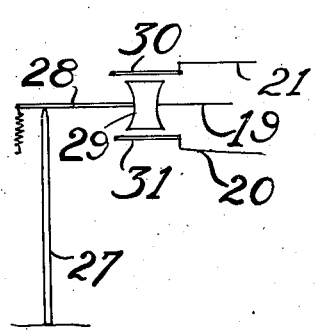
Figure 4:
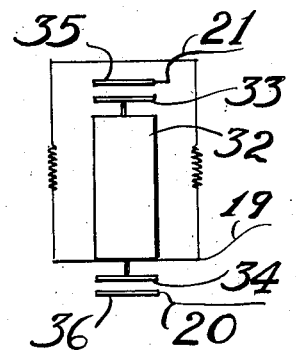

The invention will be fully understood from the following description read in connection with the accompanying drawing in which Fig. 1 is a diagram showing the electrical system, and Figs. 2, 3, and 4 are side elevations showing the various means for causing movement of the condenser plates.

Referring first to Fig. 1, reference numeral 1 denotes a movably mounted support carrying condenser plates 2 and 3. These are arranged in opposition to rigidly mounted condenser plates 4 and 5. In the double condenser thus formed movement of support 1 either to the right or left results in a corresponding increase or decrease respectively in the capacity of condensers 2, 4 and 3, 5.

In the preferred form of the invention illustrated, the means for indicating the variation of capacity is a vacuum tube (audion) circuit employing a four element tube such as a screen grid tube. In this the vacuum tube is shown diagrammatically with grid 6 and plate 7. Variable condensers 8 and 9 are in the grid circuit and the plate circuit respectively of the vacuum tube. A variable condenser 10 is in a bridge between the grid and plate circuits. An inductance 11 is arranged in the plate circuit and an inductance 12 in the grid circuit. A grid battery 13 and blocking condenser 14 are supplied as usual. Also the radio frequency choke 15 and output transformer 16 may be of the conventional type. The batteries for operating the vacuum tube are indicated at 17 and 18.

It will be understood that other equivalent means may be substituted for the four element vacuum tube shown, for example a three-electrode tube.

The interior plates 2, 3 of the double condenser are connected by a lead 19 with the vacuum tube circuit and the exterior plates 4, 5 are connected with the plate and grid portions of that circuit by leads 20 and 21, respectively. The support 1 carrying plates 2 and 3 is made of a suitable electrically conductive material.

In Fig. 2 is shown a microphone diaphragm 22 connected by a rod 23 with a condenser plate 24. This latter is arranged between condenser plates 25 and 26 which are mounted in fixed position. Plate 24 is connected with the vacuum tube circuit by lead 19 as in Fig. 1. Plates 25 and 26 are connected respectively with that circuit by leads 20 and 21.

In Fig. 3, 27 illustrates the expansible member of a thermal expansion measuring instrument. Pivotally mounted on the top of this member is a rod 28 carrying a condenser element 29. Condenser plates 30 and 31 are arranged in opposed relation to the element 29. Connection to the vacuum tube circuit is made as described above.

Fig. 4 illustrates the use of the invention in connection with the seismograph. The suspended weight member 32 of this instrument carries condenser plates 33 and 34 arranged interiorly with respect to condenser plates 35 and 36. Vibratory motion of the weight member varies the capacity of the double condenser thus formed. The changes in capacity are impressed on the vacuum tube circuit by connection with it through the leads shown.

The operation of the present invention in any of the foregoing embodiments is as follows:

The capacities of the condensers 2, 4 and 3, 5 for example are preferably made substantially equal when they are in their equilibrium position, but such equality is not essential. Then the circuit is tuned by means of the condenser 8 or 9 or both. Condenser 10 acts as a feed-back. When the circuit has been tuned it is very sensitive to changes in the capacity of the double condenser system. Even extremely minute displacements of the interior plates with respect to the outer plates cause a variation in the plate current sufficient to make a readily perceptible indication. This indication may be audible as through ear phones, or it may be visual as by the interposition of oscillographic means and the like. Suitable provision for recording the indications can be made if desired in known manner. Any desired amplification can be obtained by the use of additional amplifying means. The evaluation and interpretation of the indications can be made in ways well understood in the art.

It has heretofore been proposed to determine displacements by causing the same to vary a condenser capacity acting on the grid circuit of a vacuum tube. The present arrangement is distinguished by the use of a double condenser connected to influence not only the grid circuit but also the plate circuit of the tube. These circuits are influenced oppositely and the resulting effect is therefore magnified. An extraordinary delicacy of indication is obtained; movements approaching the atomic range can be reliably detected.

In the appended claims reference is made to determining displacements. This is to be understood as meaning not only the physical extent of the displacement but also the inferences and deductions that can be made from a study of the indications obtained, and the uses that result therefrom. As an example of the latter, mention is made of microphone reproduction for broadcasting.

While interior condenser plates movably mounted have been shown, it is obvious that these may be stationary and the outer plates movable. Various other changes and alternative arrangements may be made within the scope of the appended claims, in which it is intended to claim all novelty inherent in the invention as broadly as the prior art permits.

We claim:

1. Method of determining a minute displacement, comprising energizing a vacuum tube circuit including grid and plate circuits, tuning the circuits, causing such displacement to change the capacity of condensers simultaneously and oppositely, impressing such changes respectively on the grid circuit and the plate circuit of the vacuum tube, and determining the extent of displacement from the resulting variation in the current output of the electrical system.

2. In combination with an electrical circuit including a vacuum tube having a grid circuit and a plate circuit, means for tuning the circuits, a plurality of sets of relatively movable condenser elements connected to constitute a double condenser, a body capable of displacement and connected with said condensers so as to change their capacity simultaneously and oppositely due to the displacement to upset the plate current, and means for impressing the changes of capacity upon the said grid and plate circuits respectively.

3. Apparatus according to claim 2 in which the body capable of displacement consists of the vibratory body of a seismograph.

4. In an electrical circuit including a three element tube having a plate circuit and a grid circuit, means for tuning the circuits, a condenser connected in the circuit with the plate of said tube, a condenser connected in the circuit with the grid of said tube, and means for varying the capacities of the condensers simultaneously and in opposite directions to change the current of the plate circuit.

5. In an electrical circuit including a three element tube having a plate circuit and a grid circuit, a variable condenser in the grid circuit and a variable condenser in the plate circuit for controlling the plate current, a condenser connected in the circuit with the plate of said tube, a condenser connected in the circuit with the grid of the tube, and means for varying the capacities of the condensers simultaneously and in opposite directions to change the controlled current of the plate circuit.

6. In an electrical circuit including a three element tube having a plate circuit and a grid circuit, means for tuning the circuits, a condenser connected in the circuit with the plate of said tube, a condenser connected in the circuit with the grid of the tube, means for varying the capacities of the condensers simultaneously and in opposite directions to change the current of the plate circuit, and a bridge between the grid and plate circuits.

7. In an electrical circuit, a vacuum tube having a plate circuit and a grid circuit, means for tuning the circuits and a variable double condenser including spaced outer electrically conductive plates, a unit including inner electrically conductive plates mounted for movement toward and from the outer plates, a vibratory member rigidly connected to the unit whereby vibrations of the member vary the capacities of the condensers simultaneously and in opposite directions to upset the plate current, means for grounding the inner plates, the outer plates being in the plate and grid circuits respectively.

8. In an electrical circuit, a vacuum tube having a plate circuit and a grid circuit, means for tuning the circuits, and a variable double condenser including a unit comprising spaced electrically conductive plates, a unit including inner electrically conductive plates, a vibratory member rigidly connected to one of the units whereby vibrations of the member vary the capacities of the condensers simultaneously and in opposite directions to change the current of the plate circuit, means for grounding the plates of one unit, the plates of the other unit being in the plate and grid circuits respectively.

9. In an electrical circuit including a three element tube having a plate circuit and a grid circuit, means for tuning the circuits, a condenser connected in the circuit with the plate of said tube, a condenser connected in the circuit with the grid of said tube, and a microphone diaphragm operatively associated with the condensers to vary the capacities of the condensers simultaneously and in opposite directions to change the current of the plate circuit upon vibration of the diaphragm.

10. In an electrical circuit, a vacuum tube having a plate circuit and a grid circuit, means for tuning the circuits, and a variable double condenser including a unit comprising spaced outer electrically conductive plates, a second unit including an inner electrically conductive plate, a microphone diaphragm associated with one of the units whereby vibrations of the diaphragm vary the capacities of the condensers simultaneously and in opposite directions to change the current of the plate circuit, and means for grounding one of the units, the plates of the other unit being in the plate and grid circuits respectively.

11. In an electrical circuit, a vacuum tube having a plate circuit and a grid circuit, means for tuning the circuits, and a variable double condenser including spaced outer electrically conductive plates, an inner electrically conductive plate mounted for movement toward and from the outer plates, a microphone diaphragm connected to the inner plate whereby vibrations of the diaphragm vary the capacities of the condensers simultaneously and in opposite directions to upset the plate current, and means for grounding the inner plate, the outer plates being in the plate and grid circuits respectively.

12. In an electrical circuit including a three element tube having a plate circuit and a grid circuit, means for tuning the circuits, a condenser connected in the circuit with the plate of said tube, a condenser connected in the circuit with the grid of said tube, and a seismograph including a mass resiliently suspended from a frame, the mass and frame being operatively associated with the condensers to vary the capacities of the condensers simultaneously and in opposite directions to change the current of the plate circuit upon vibration of the frame.

13. In an electrical circuit, a vacuum tube having a plate circuit and a grid circuit, means for tuning the circuits, and a variable condenser including a unit having spaced outer electrically conductive plates, and a unit including inner electrically conductive plates, a seismograph including a mass resiliently suspended from a frame, means connecting the mass to the plates of one of the units, means connecting the frame to the plates of the other unit whereby vibrations of the frame vary the capacities of the condensers simultaneously and in opposite directions to change the current of the plate circuit, means for grounding the plates of one of the units, the plates of the other unit being in the plate and grid circuits.

14. In an electrical circuit, a vacuum tube having a plate circuit and a grid circuit, means for tuning the circuits, and a variable condenser including spaced outer electrically conductive plates and an inner electrically conductive plate mounted for movement toward and from the outer plates, and a seismograph including a mass resiliently suspended from a frame, the mass being rigidly connected to the inner plate and the frame being connected to the outer plates whereby vibrations of the frame vary the capacities of the condensers simultaneously and in opposite directions to upset the plate current, the inner plate being grounded, the outer plates being in the plate and grid circuits respectively.

15. In an electrical circuit including a three element tube having a plate circuit and a grid circuit, means for tuning the circuits, a condenser connected in the circuit with the plate of said tube, a condenser connected in the circuit with the grid of said tube, and an expansible member operatively associated with the condensers to vary the capacities of the condensers simultaneously and in opposite directions to change the current of the plate circuit upon movement of the expansible member.

16. In an electrical circuit, a vacuum tube having a plate circuit and a grid circuit, means for tuning the circuits, and a variable double condenser including spaced outer electrically conductive plates, an inner electrically conductive plate mounted for movement toward and from the outer plates, and an expansible member rigidly connected to the inner plate whereby movement of the expansible member varies the capacities of the condensers simultaneously and in opposite directions to upset the plate current, means for grounding the inner plate, the outer plates being in the plate and grid circuits respectively.

17. In an electrical circuit including a three element tube having a plate circuit and a grid circuit, a variable condenser and an inductance in the plate circuit for obtaining resonance of high frequencies in the plate circuit, a variable condenser and an inductance in the grid circuit for obtaining resonance of high frequencies in the grid circuit, a condenser connected in the circuit with the plate of said tube, a condenser connected in the circuit with the grid of the tube, and means for varying the capacities of the condensers simultaneously and in opposite directions to change the current of the plate circuit.

18. In an electrical circuit including a three element tube having a plate circuit and a grid circuit, a variable condenser and an inductance in the plate circuit for obtaining resonance of high frequencies in the plate circuit, a variable condenser and an inductance in the grid circuit for obtaining resonance of high frequencies in the grid circuit, a condenser connected in the circuit with the plate of said tube, a condenser connected in the circuit with the grid of the tube, and a microphone diaphragm operatively associated with the condensers to vary the capacities of the condensers simultaneously and in opposite directions to change the current of the plate circuit upon vibration of the diaphragm.

LUDWIG W. BLAU.
ANDREW B. BRYAN.
WHITMAN D. MOUNCE.